US010023072B2

(12) United States Patent
Ogale

(10) Patent No.: US 10,023,072 B2
(45) Date of Patent: Jul. 17, 2018

(54) DC-DC CONVERTER FOR VEHICLE

(71) Applicant: Johnson Controls Technology Company, Holland, MI (US)

(72) Inventor: Anuradha G. Ogale, Madison, WI (US)

(73) Assignee: Johnson Controls Technology Company, Holland, MI (US)

(*) Notice: Subject to any disclaimer, the term of this patent is extended or adjusted under 35 U.S.C. 154(b) by 879 days.

(21) Appl. No.: 14/221,366

(22) Filed: Mar. 21, 2014

(65) Prior Publication Data
US 2015/0054337 A1 Feb. 26, 2015

Related U.S. Application Data

(60) Provisional application No. 61/870,101, filed on Aug. 26, 2013.

(51) Int. Cl.
*B60L 1/00* (2006.01)
*B60L 15/00* (2006.01)
*H02M 3/337* (2006.01)
*H02M 3/335* (2006.01)

(52) U.S. Cl.
CPC ......... *B60L 15/007* (2013.01); *H02M 3/3376* (2013.01); *H02M 3/33569* (2013.01); *B60L 2210/10* (2013.01); *B60L 2210/12* (2013.01); *H02M 3/33546* (2013.01); *Y02T 10/645* (2013.01); *Y02T 10/7216* (2013.01); *Y02T 10/7233* (2013.01)

(58) Field of Classification Search
CPC ..................................................... B60L 15/007

USPC ....................................................... 307/10.1
See application file for complete search history.

(56) References Cited

U.S. PATENT DOCUMENTS

| | | | | |
|---|---|---|---|---|
| 7,800,921 B2 * | 9/2010 | Zhu | ................... | H02M 3/33507 361/730 |
| 8,330,299 B2 * | 12/2012 | Steigerwald | .......... | H02M 3/158 307/140 |
| 8,415,824 B2 * | 4/2013 | Chemin | .................... | B60L 3/00 307/9.1 |
| 8,970,136 B2 * | 3/2015 | Kikuchi | ............. | H05B 33/0815 315/291 |
| 9,085,238 B2 * | 7/2015 | Sisk | ......................... | B60L 1/00 |

OTHER PUBLICATIONS

R. Erickson, D. Maksimovic, "Fundamentals of Power Electronics", Kluwer Academic Publishers, 2004.
B.J. Baliga, "Semiconductors for high voltage, vertical channel field effect transistors", AIP Journal of Applied Physics, 1981.
(Continued)

*Primary Examiner* — Stephen W Jackson
(74) *Attorney, Agent, or Firm* — George R. Corrigan

(57) ABSTRACT

A method and apparatus for converting dc power from one voltage to another, in a mHEV includes an input filter, a converter circuit, and an output filter. the circuit is implemented with wide band gap devices, and may be a full bridge, half bridge, or push pull circuit. The size is preferably 120 cc, and the output power is preferably at least 500 W, 1 KW or up to 3 KW. The efficiency is preferably at least 80% or 90%, and the converter operates at a frequency of at least between 20 KHz and 2 MHz.

41 Claims, 6 Drawing Sheets

(56) References Cited

OTHER PUBLICATIONS

L. Vinnikov, V. Bolgov, "Efficiency Optimization of the High-Power Isolated DC/DC Converters through THD and Losses Reduction in Isolation Transformers", International Conference on Renewable Energies and Power Quality (ICREPQ'09), Valencia (Spain), 2009.
A.I. Pressmann, Switching Power Supply Design, McGraw Hill, 1991.
Zhang Xi, Deadtime calculation for IGBT modules, Infineon Technologies AG, 2008.
M. Bhatnagar and B. J. Baliga, Analysis of Silicon Carbide Power Device Performance, IEEE Proceedings of ISPSD, 1991.
J. Biela, M. Schweizer, S. Waffle, and J. Kolar, "SiC versus Si—Evaluation of Potentials for Performance Improvement of Inverter and DC-DC Converter Systems by SiC Power Semiconductors", IEEE Transactions on Industrial Electronics, vol. 58, No. 7, pp. 2872-2882, 2011.
R. Wang, "High Power Density and High Temperature Converter Design for Transportation Applications", PhD Dissertation, Virginia Polytechnic Institute and State University, Jun. 2012.
"Gallium Nitride (GaN) versus Silicon Carbide (SiC) in the High Frequency (RF) and Power Switching Applications", Microsemi PPG,www.digikey.com.
http://epc-co.com/epc/.
www. cree.com.

* cited by examiner

DC-DC CONVERTER FOR VEHICLE

FIELD OF THE INVENTION

The present disclosure relates to the field of dc-dc converters that may be used in a micro hybrid vehicle.

BACKGROUND OF THE INVENTION

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. As will be appreciated by those skilled in the art, hybrid electric vehicles (HEVs) combine an internal combustion engine propulsion system and a battery-powered electric propulsion system, such as 48 volt or 130 volt systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid electric vehicles (PHEVs), and electric vehicle conversions of hybrid electric vehicles and conventional internal combustion engine vehicles.

Micro Hybrid technology can use a dual voltage architecture, such as a traditional 12V vehicular electrical system used in conjunction with a lead-acid battery, and a 48 volt vehicular electrical system used in conjunction with a Lithium-ion battery. 12 volt electrical system, as used herein, refers to a traditional vehicular electrical system that operates at a nominal 12 volts. The actual voltage varies dynamically depending in part on the charge state of the battery and the load, and an any point in time can be more or less than 12 volts. 48 volt electrical system, as used herein, refers to a vehicular electrical system that operates at a nominal 48 volts, such as one using an LI-ion battery. The actual voltage varies dynamically depending in part on the charge state of the battery and the load, and an any point in time can be more or less than 48 volts. The 12 volt system can include things such as lights, audio/entertainment, electronic modules and ignition. The 48 volts system can include the A/C compressor, active chassis, and regeneration. These systems support higher power loads and provide redundancy. Typically an 8-10 kW motor/generator captures energy for regeneration, supports re-start and supports higher power loads. A DC/DC converter bridges between the higher 48 volt system and the traditional 12 volt system.

Such a micro hybrid vehicle can change electrical load management due to high power regeneration, and provide for electrification of new loads such as air conditioning, active chassis and safety, electric supercharging, as well as result in increased fuel efficiency.

The DC-DC converter needed for to bridge the systems should be able to provide sufficient power without taking excess space. Moreover, it should be able to withstand the vehicular environment, including high temperatures.

SUMMARY OF THE PRESENT INVENTION

According to a first aspect of the disclosure a converter is used in a vehicle having a first electrical system at a first voltage and a second electrical system at a second voltage. The converter comprises an input filter adapted to receive power from the first electrical system. A dc-dc converter receives power from the input filter, and has at least one control input. An output filter receives power from the dc-dc converter provides power to the second electrical system. A controller has a control output that is connected to the control input of the converter. The dc-dc converter includes wide band gap semiconductor devices.

According to a second aspect of the disclosure a converter is used in a vehicle having a first electrical system at a first voltage and a second electrical system. The converter comprises an input filter adapted to receive power from the first electrical system and a dc-dc converter that receives power from the input filter. The dc-dc converter has at least one control input. An output filter is connected to receive power from the dc-dc converter and to provide power to the second electrical system. A controller has a control output connected to the control input of the dc-dc converter. The power density of the converter is least 4.17 watts/cc.

According to a third aspect of the disclosure a dc-dc converter is used in a micro hybrid vehicle having a first electrical system and a second electrical system, wherein the size of the converter is at most 120 cc, and the power output of the converter is at least 500 watts.

The dc-dc converter is a buck converter, a half-bridge converter, a full-bridge converter and/or a push-pull converter in various alternatives.

The first voltage is less than 60 volts, about 48 volts, and/or greater than 12 volts in various alternatives.

The second voltage is approximately 12 volts in some alternatives.

The wide band gap semiconductor devices are at least one of SiC and GaN transistors in various embodiments.

The efficiency of the dc-dc converter is at least 80% or at least 90% in various embodiments.

The size of the converter is at most 120 cc, and the power output of the converter is at least 500 watts, or at least 1000 watts, or up to 3000 watts in various embodiments.

The control output is provided at a frequency of at least 20 KHz, at least 1 MHz, or at least 2 MHz. in various alternatives.

The vehicle is a start stop vehicle and/or a a micro hybrid vehicle in various embodiments.

The power density of the converter is least 4.17 watts/cc, at least 8.33 watts/cc, or least 25 watts/cc in various embodiments.

The dc-dc converter includes wide band gap semiconductor devices in another embodiment.

Other principal features and advantages of will become apparent to those skilled in the art upon review of the following drawings, the detailed description and the appended claims.

Figure 1:
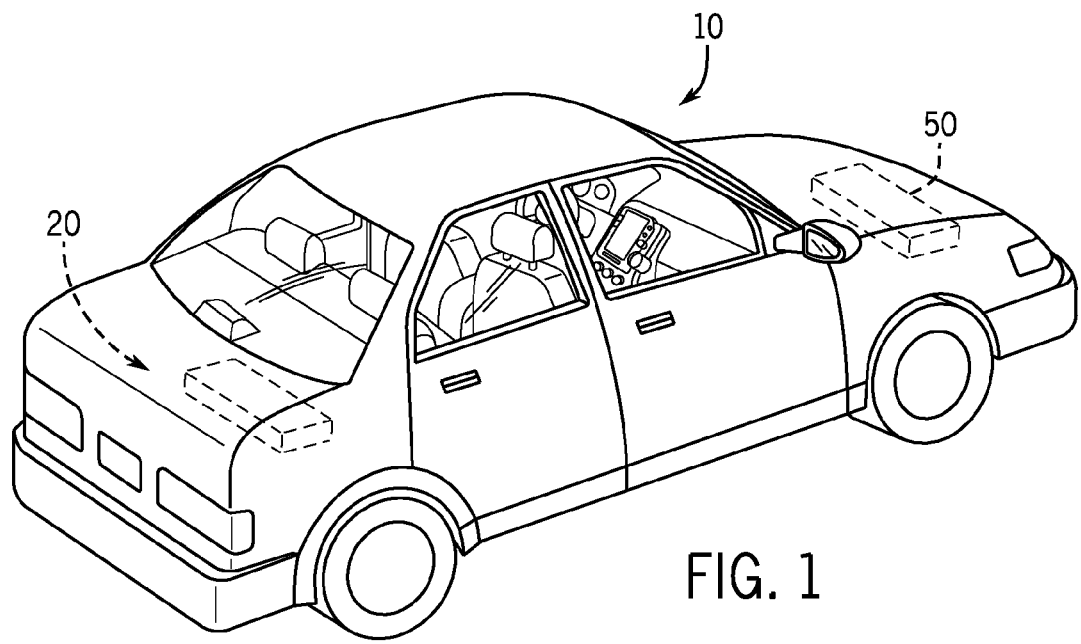
FIG. 1 is perspective view of a microhybrid electric vehicle (mHEV) vehicle (an example of an xEV) having a dual voltage electrical system with a dc-dc converter in accordance with an embodiment of the present approach.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular vehicle and particular electrical systems, using particular topologies, components and devices, it should be understood at the outset that the dc-dc converter could be implemented using other topologies, components and devices, and used with other electrical systems and in other xEV vehicles, or in nonEV vehicles. For example, while the preferred embodiment is designed for a 12/48 dual voltage electrical system, the nominal voltage of the two electrical systems can be something other than 12 and 48 volts.

Traditional vehicle electrical system are powered by a single lead acid battery and utilize only an internal combustion engine for motive power. An mHEV uses not only these traditional components, but a higher voltage battery (e.g., a 48V lithium ion battery module) in addition to the 12V lead acid battery along with other components such as a belt integrated starter-generator, sometimes referred to as a belt alternator starter (BAS). The 12 volt system may be used to power ignition of the combustion engine using a traditional starter motor and/or support conventional 12V accessory loads, and the 48 volt system may be used to power a BAS and to power one or more vehicle accessories when the combustion engine is not running.

The present disclosure relates to a dc-dc converter, including related circuitry, that is used in a micro hybrid vehicle (mHEV). A suitable mHEV is generally described in U.S. patent application Ser. No. 13/954,907 filed on Jul. 30, 2013 entitled "DC-DC Convertor [sic] for Batteries Having Multiple Positive Terminals," which is herein incorporated by reference in its entirety. The dc-dc converter may be used in other systems include Xevs and start stop vehicles. Start stop vehicles automatically cut off the gas-powered engine while idling.

Specifically, the present disclosure is generally directed to a mHEV that includes a dual voltage dc electrical system, preferably with a specific battery pack chosen for each of the two dc voltages, or a single dual voltage battery pack. A dc-dc converter converts power from one voltage to the other, preferably from the greater of the two dc voltages, to the lesser of the two dc voltages. The dc-dc converter, includes, in the preferred embodiment, wide band gap semiconductor devices, such as SiC and GaN transistors, and/or has an efficiency of at least 80%, and 90% in other embodiments, and/or has a size of at most 120 cc with the power output of the converter being at least 500 watts or at least 1000 watts or up to 3000 watts, and/or having a power density of the converter is least 4.17 watts/cc, 8.33 watts/cc, or up to 25 watts/cc. The dc-dc converter preferably uses a topology of a half-bridge converter, a full-bridge converter, and/or a push-pull converter, operating at a frequency of at least 20 KHz, 1 MHz, or 2 MHz.

Wide band gap semiconductor device, as used herein, is a semiconductor device with electronic band gaps significantly larger than one electronvolt (eV), such as greater than 1.7 eV. The efficiency of a dc-dc converter, as used herein, is the ratio of the power provided by the dc-dc converter to the power received by the dc-dc converter. The efficiency calculation includes switching losses in MOSFETs, conduction losses in MOSEFTs and rectifier diodes and losses in the transformer and basic output filter inductor. It does not include losses in the EMI filter inductors as well as any capacitor losses.

Turning now to FIG. 1, a perspective view of an xEV 10 in the form of an automobile (e.g., a car) having a battery system 20 and a dual voltage electrical system 50 in accordance with present embodiments for providing all or a portion of the power (e.g., electrical power and/or motive power) for the vehicle 10, as described above, is shown. Although the xEV 10 may be any of the types of xEVs described above, by specific example, the xEV 10 is preferably a mHEV, including an internal combustion engine equipped with a microhybrid system which includes a start-stop system that may utilize the battery system 20 to power at least one or more accessories (e.g., AC, lights, consoles, etc.), as well as the ignition of the internal combustion engine, during start-stop cycles.

Further, although the mHEV 10 is illustrated as a car in FIG. 1, the type of vehicle may differ in other embodiments, all of which are intended to fall within the scope of the present disclosure. For example, the mHEV 10 may be representative of a vehicle including a truck, bus, industrial vehicle, motorcycle, recreational vehicle, boat, or any other type of vehicle that may benefit from the use of electric power.

Figure 2:
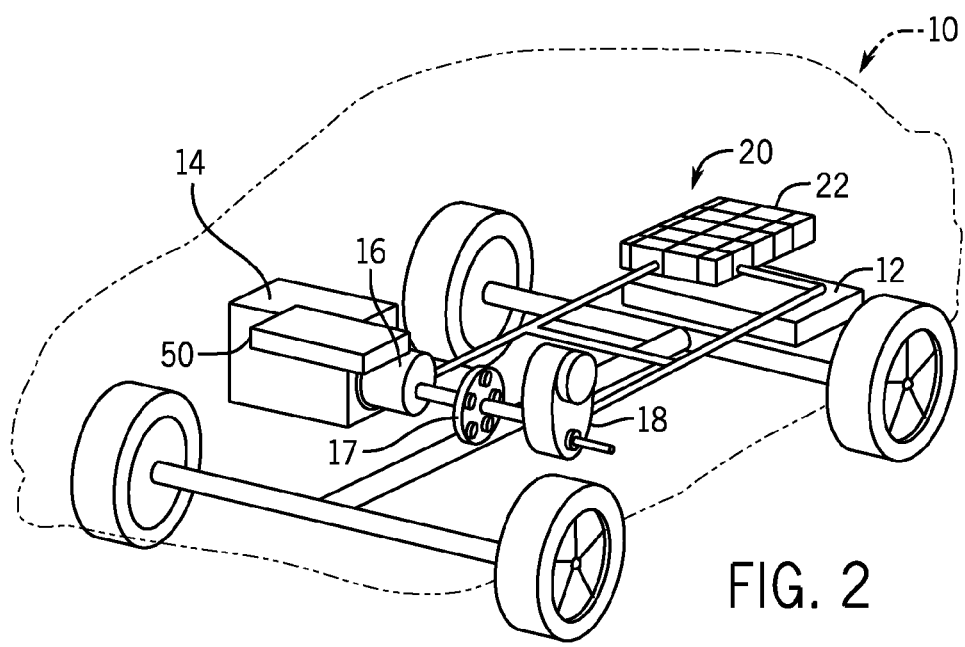
FIG. 2 is cutaway schematic view of the mHEV of FIG. 1.

FIG. 2 illustrates a cutaway schematic view of an embodiment of the xEV 10 of FIG. 1, provided in the form of an mHEV having the battery system 20, which includes one or more battery modules 22, and the dual voltage electrical system 50. In particular, the battery system 20 illustrated in FIG. 2 is disposed toward the rear of the vehicle 10 proximate a fuel tank 12, and the dual voltage electrical system 50 is disposed near an internal combustion engine 14. In other embodiments, the battery system 20 may be provided immediately adjacent the fuel tank 12, provided in a separate compartment in the rear of the vehicle 10 (e.g., a trunk), in the location of a traditional lead acid battery, or provided in another suitable location in the xEV 10. The vehicle 10 also includes an electric motor 16, a power split device 17, and a generator 18 as part of the drive system.

It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 20 and the electrical system 50, the type of vehicle, the type of xEV technology, and the battery chemistry, among other features, may differ from those shown or described.

Figure 3:
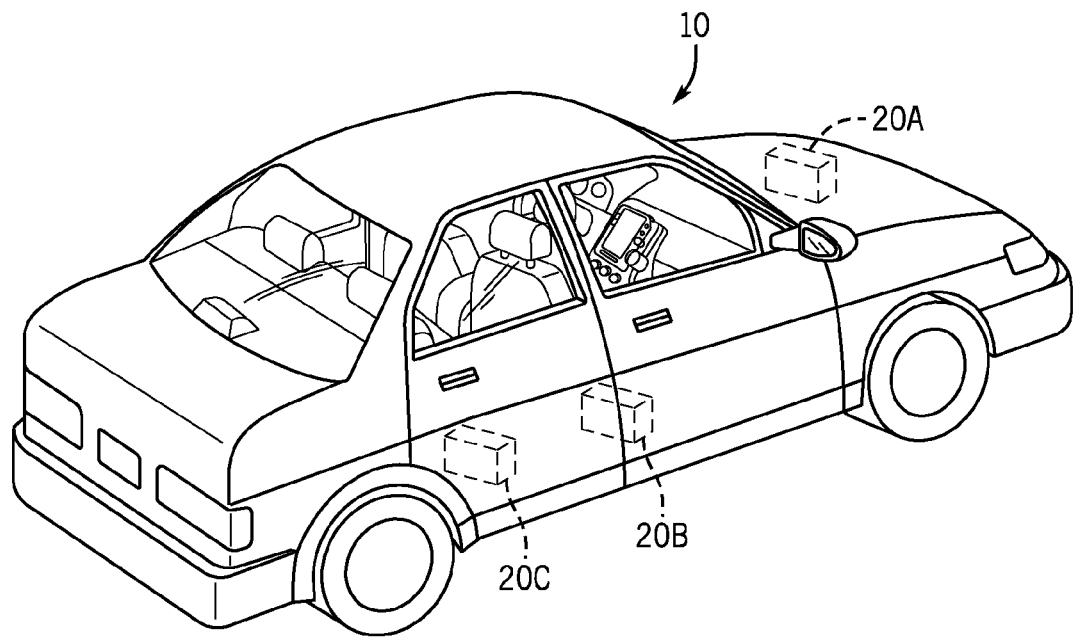
FIG. 3 is a perspective view of an (mHEV) in accordance with an embodiment of the present approach.

FIG. 3 illustrates a cutaway schematic view of another embodiment of the xEV 10 of FIG. 1, provided in the form of a mHEV 10 having the battery system 20. As discussed above, the battery system 20 for use with a microhybrid system of an mHEV 10 may include a single battery that provides a first voltage (e.g. 12V) and a second voltage (e.g. 48V) and that is substantially equivalent in size to a traditional 12V lead acid battery used in traditional internal combustion vehicles. Hence, such a battery system 20 may be placed in a location in the mHEV 10 that would have housed the traditional battery prior to conversion to an mHEV. For example, as illustrated in FIG. 3, the mHEV 10 may include the battery system 20A positioned similarly to a lead-acid battery of a typical combustion-engine vehicle (e.g., under the hood of the vehicle 10).

Figure 4:
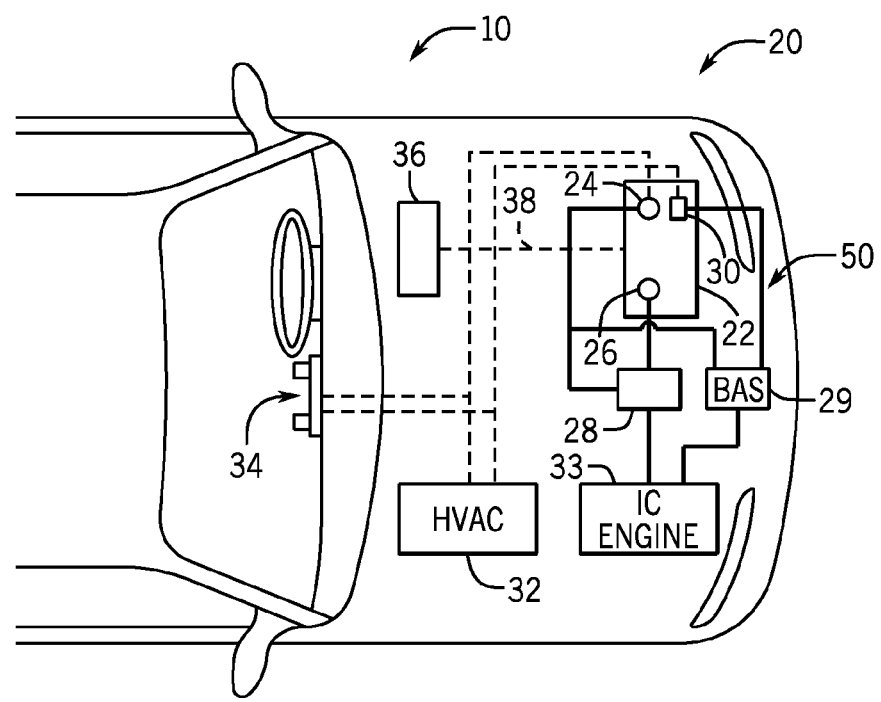
FIG. 4 is a schematic view of the mHEV embodiment of FIG. 2, illustrating power distribution throughout the mHEV, in accordance with an embodiment of the present approach.

FIG. 4 is a schematic view of an embodiment of the mHEV 10 of FIG. 3 having an embodiment of the battery system 20 and dual voltage electrical system 50 disposed under the hood of the vehicle 10. As previously noted and as discussed in detail below, the battery system 20 may further have dimensions comparable to those of a typical lead-acid battery to limit or eliminate modifications to the mHEV 10 design to accommodate the battery system 20. Further, the battery system 20 illustrated in FIG. 4 is a three-terminal battery that is capable of providing two different output voltages. For example, a first terminal 24 may provide a ground connection, a second terminal 26 may provide a 12V output, and a third terminal 30 may provide a 48V output. As illustrated, the 48V output of the battery module 22 may be coupled to a BAS 29, which may be used to start the internal combustion engine 33 during start-stop cycle, and the 12 V output of the battery module 22 may be coupled to a traditional ignition system (e.g., starter motor 28) to start the internal combustion engine 33 during instances when the BAS 29 is not used to do so. It should also be understood that the BAS 29 may also capture energy from a regenerative braking system or the like (not shown) to recharge the battery module 22. Other embodiments provide for other battery types.

It should be appreciated that the 48 V and 12 V outputs of the battery module 22 may also be provided to other components of the mHEV 10. Examples of components that may utilize the 48 V output in accordance with present embodiments include radiator cooling fans, climate control fans, electric power steering systems, active suspension systems, electric airconditioning systems, auto park systems, cooled seats, electric oil pumps, electric super/turbochargers, electric water pumps, heated seats, heated windscreen/defrosters, and engine ignitions. Examples of components that may utilize the 12 Volt output in accordance with the present embodiments include window lift motors, vanity lights, tire pressure monitoring systems, sunroof motor controls, power seats, alarm systems, infotainment online features, navigation features, lane departure warning systems, electric parking brakes, and external lights. The examples set forth above are not exhaustive and there may be overlap between the listed examples. Indeed, for example, in some embodiments, features listed above as being associated with a 48 V load may utilize the 12 V output instead and vice versa.

In the illustrated embodiment, the 48 V output of the battery module 22 may be used to power one or more accessories of mHEV 10. For example, as illustrated in FIG. 4, the 48 V output of the battery module 22 may be coupled to a heating, ventilation, and air conditioning (HVAC) system 32 (e.g., including compressors, heating coils, fans, pumps, and so forth) of mHEV 10 to enable the driver to control the temperature of the interior of the mHEV 10 during operation of the vehicle. This is particularly useful during idle periods when the internal combustion engine 33 is stopped and, thus, not providing any electrical power via engine charging. As also illustrated in FIG. 4, the 48 V output of the battery module 22 may be coupled to the vehicle console 34, which may include entertainment systems (e.g., radio, CD/DVD players, viewing screens, etc.), warning lights and indicators, controls for operating the mHEV 10, arid so forth. Hence, it should be appreciated that the 48 V output may, in certain situations, provide a more efficient voltage at which to operate the accessories of the mHEV 10 (e.g., compared to 12 V), especially when the internal combustion engine 33 is stopped (e.g., during start-stop cycles). It should also be appreciated that, in certain embodiments, the 48 V output of the battery module 22 may also be provided to any other suitable components and/or accessories (e.g., lights, switches, door locks, window motors, windshield wipers, and so forth) of the mHEV 10.

Also, the mHEV 10 illustrated in FIG. 4 includes a vehicle control module (VCM) 36 that may control one or more operational parameters of the various components of the vehicle 10, and the VCM 36 may include at least one memory and at least one processor programmed to perform such tasks. Like other components of the mHEV 10, the battery module 22 may be coupled to the VCM 36 via one or more communication lines 38, such that the VCM 36 may receive input from the battery module 22, and more specifically, the battery control module of the battery module 22. For example, the VCM 36 may receive input from the battery module 22 regarding various parameters, such as state of charge and temperature, and the VCM 36 may use these inputs to determine when to charge and/or discharge the battery module 22, when to discontinue charging the battery module 22, when to start and stop the internal combustion engine 33 of the mHEV 10, whether to use the BAS 29 or the starter 28, and so forth.

Figure 5:
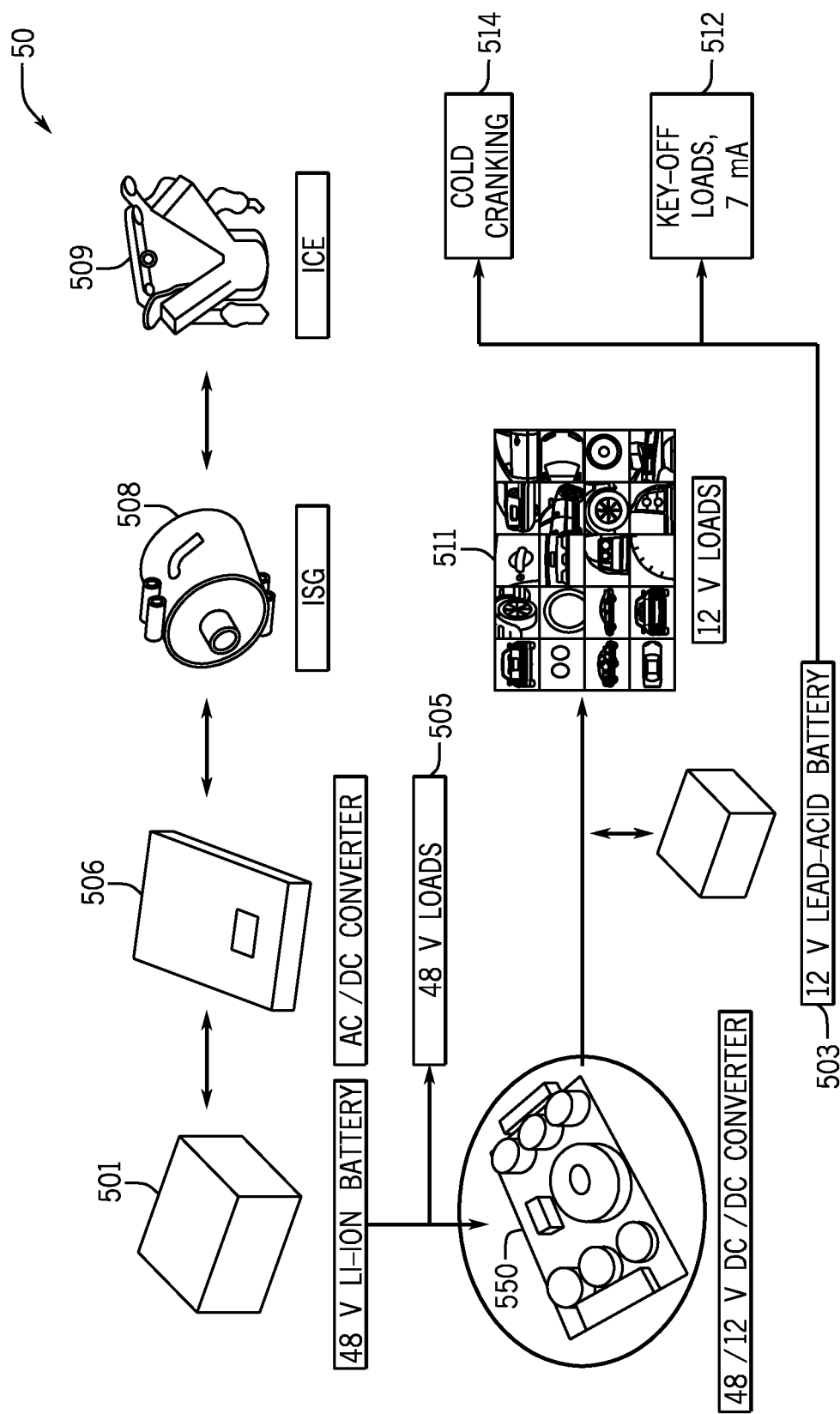
FIG. 5 is a block diagram of the energy storage and electrical systems in accordance with an embodiment of the present approach.

FIG. 5 is a block diagram of the dual voltage electrical system 50 of the present invention, including energy storage system 20. In this embodiment energy storage system 20 includes a 48V lithium ion battery 501 and a 12V lead acid battery 503. Other embodiments include a dual voltage lead acid battery. Li-ion battery 501 is in electrical communication with 48 volt loads 505 and an ac/dc converter 506. Ac/dc converter 506 is in electrical communication with an integrated starter generator 508. Integrated starter generator 508 is in electrical communication with an internal combustion engine 509 (not part of the electrical system). Lead acid battery 503 is in electrical communication with 12V loads 511, key-off loads 512, and cold cranking 514, as well as other high level interconnections (not shown). Lead acid battery 503 is also in electrical communication with a dc-dc converter 550, which will be described in greater detail below. Dc-dc converter 550 is preferably a 48V-12V converter.

48 V Li-ion battery 501 is used as a power device and effectively captures regeneration power during braking. It also supplies loads on the 48 V voltage network (such as an A/C compressor). Integrated Starter-Generator (ISG) 508 cranks IC engine 509 and provides regeneration during braking DC/AC converter 506 preferably includes a converter and transfers power from generator 508 to the 48 V DC battery system. The converter is integrated inside ISG 508 in other embodiments. 48V/12V DC-DC converter 550 transfers power from 48 V Li-ion battery 501 to the 12 V (or low voltage) load network. The 12V network consists of loads such as interior and exterior lighting, audio and entertainment, control and computing circuitry, fan/blower, electronic modules and ABS. 12 V Lead-acid battery 503 may be used for providing crank power during cold cranking conditions as well as to power key-off loads.

Figure 6:
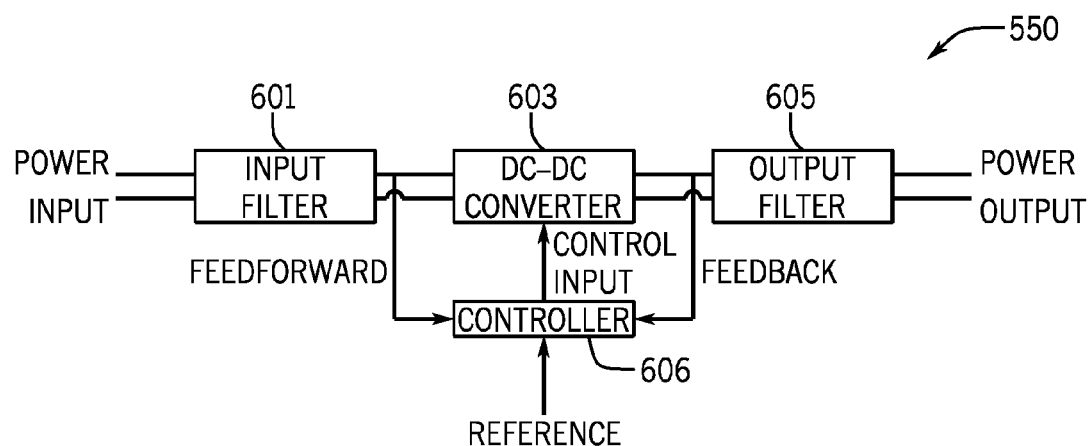
FIG. 6 is a block diagram of the DC-DC converter circuit in accordance with the present invention.

FIG. 6 is a block diagram of DC-DC converter 50, which includes an input filter 601, an output filter 603, a dc-dc converter circuit 605, which is controlled by a controller 606. Converter 50 operates and is controlled by controller 606 to receive an input voltage, preferably 48 volts, and provide a dc output voltage, preferably 12 volts. Input filter, as used herein, is an electrical circuit that receives and filters an input signal, and provides a signal suitable for conversion. Output filter, as used herein, is an electrical circuit that receives and filters a converted signal, and provides a signal suitable for use by other electrical systems.

Figure 7:
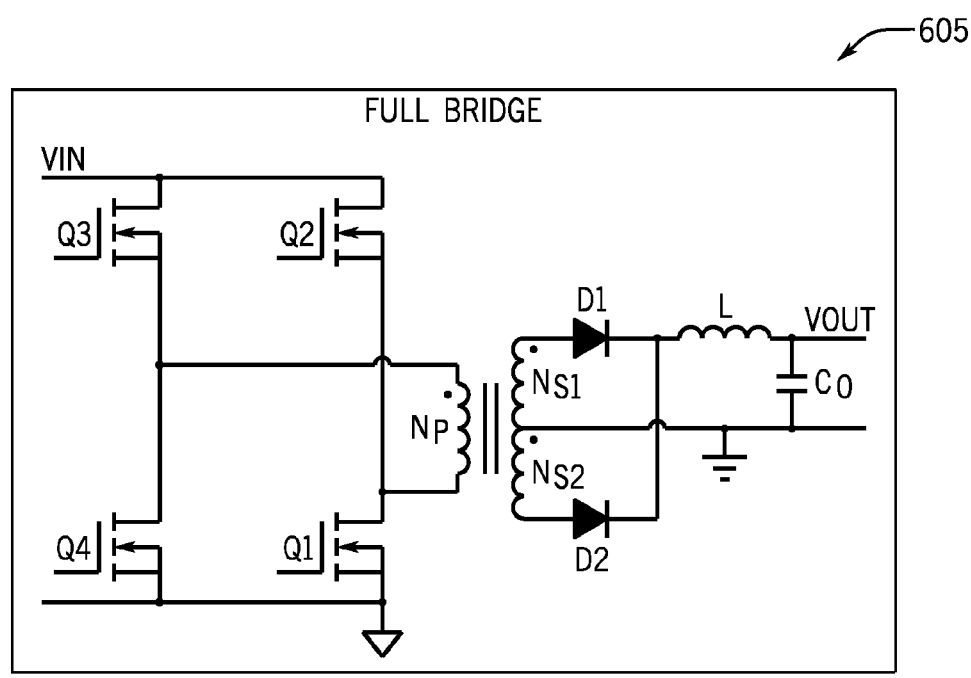
FIG. 7 shows a full bridge DC-DC converter circuit in accordance with the present invention.

Turning now to FIG. 7, one embodiment of dc-dc converter circuit 605 is shown as a full bridge bridge DC-DC converter circuit. Circuit 605 includes, in this embodiment, switches Q1-Q4, which are controlled by controller 606 (FIG. 6). Controller 606 preferably uses feedback and a PWM control scheme, such as PID, PI, etc. Open loop control may also be used.

Figure 8:
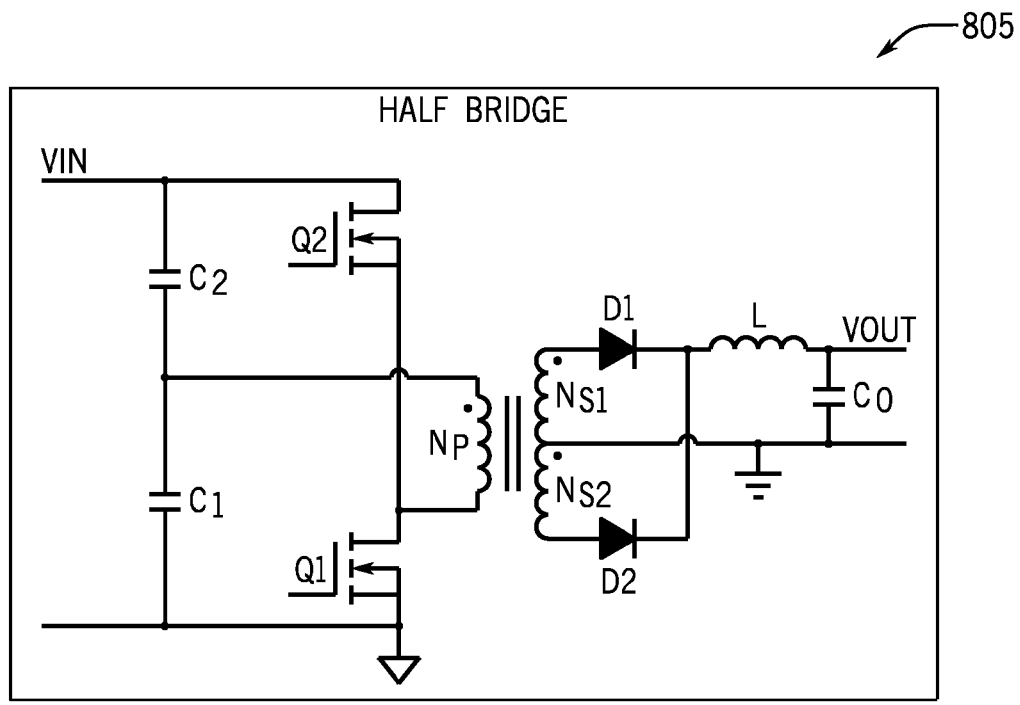
FIG. 8 shows a full bridge DC-DC converter circuit in accordance with the present invention.

FIG. 8 shows a half bridge DC-DC converter 805 that may be used for the DC-DC converter of FIGS. 5 and 6. It is preferably controlled using feedback and a PWM control scheme, such as PID, PI, etc. Open loop control may also be used.

Figure 9:
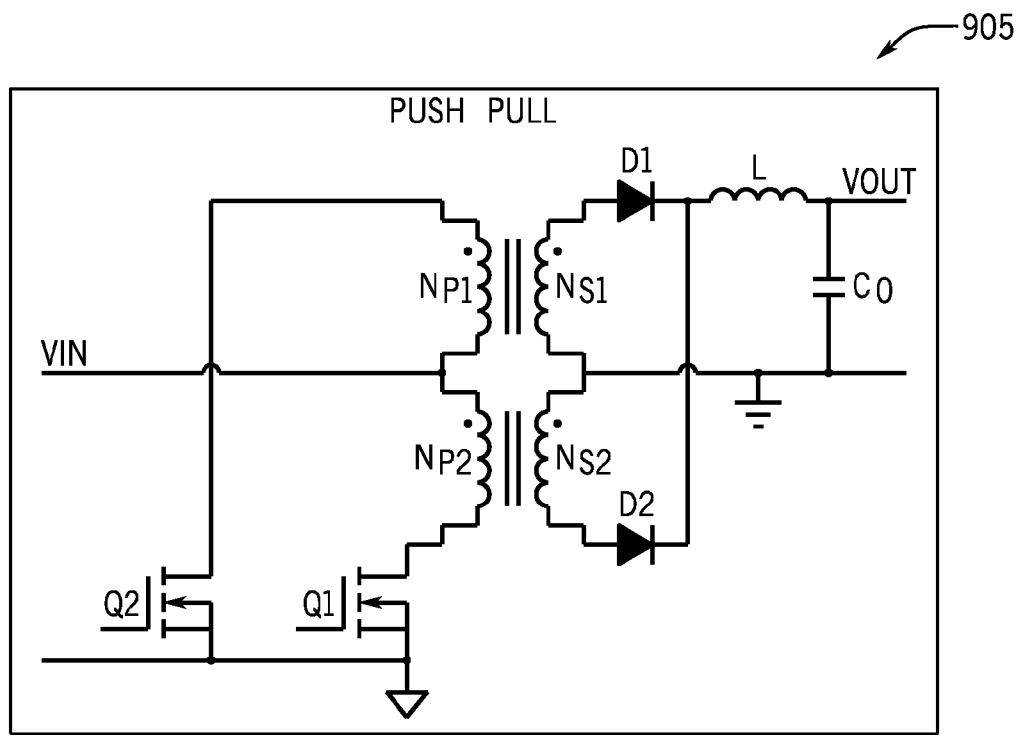
FIG. 9 shows a push-pull isolated buck DC-DC converter circuit in accordance with the present invention.

FIG. 9 shows a push-pull isolated buck DC-DC converter 905 that may be used for the DC-DC converter of FIGS. 5 and 6. It is preferably controlled using feedback and a PWM control scheme, such as PID, PI, etc. Open loop control may also be used.

DC-DC converters 605, 805 and 905 are preferably isolated and soft switched. The switches are preferably wide-band gap semiconductor devices, such as SiC and GaN transistors. The topologies of 605, 805 and 905 give good transformer core utilization due to their double-ended nature, and thus help reduce the size of the magnetics, and are well suited for isolated hard switched DC-DC converters. At higher power levels (for example, above 750 W), full bridge topology is preferred due to its ability to provide higher power density and greater efficiency. However, full bridges have a greater component count.

Preferably, the efficiency of the dc-dc converter is at least 80%, and is at least 90% in other embodiments. The efficiency can be favorably affected by using the preferred devices and/or a desired switching frequency, and/or isolating the converter. Converter 550 has a volume of at most 120 cc in the preferred embodiment (which includes the switches i.e. MOSFETs and diodes, inductors, capacitors and transformer-filters used for purpose of reducing EMI and heat sink are not included in the size calculations). The power output of the converter is, in various embodiments at least 500 watts or 1000 watts, or up to 3000 watts, which results in a power density of least 4.17 watts/cc, 8.33 watts/cc, or 25 watts/cc, respectively. The size can be favorably affected by increasing the switching frequency.

The particular devices and topology used to implement DC-DC converter 550 may be chosen by considering desired converter specifications for a given vehicle. For example, one embodiment provides that the power requirement of mHEV 10 for regeneration or boost is 11.5 kW and should be provided over a time of 20 seconds. Cold cranking power is required at −30 C, for three, 2 second pulses, with 10 second rest periods is 5 kW. The key off load requirements are 7 mA. Operating current requirement is 60 rms Amps and the nominal voltage is 48 VDC. The maximum voltage permissible is 60 VDC. The usable energy required for high power, operational loads, is 70 Wh and the usable energy for low power (key off) is 250 Wh. The operating temperature may be −25 C to 65 C and the cell operating temperature is 40 C. Power derating occurs when the cell temperature reaches 57 C at an ambient temperature of 37 C for 30 minutes and the total pack resistance is 26 mohms. Given these vehicle specifications, the maximum power output is 3 kW, the size of the converter is 120 cc and the efficiency is at least 80%. This is a power density of 8.33 watts/cc. Other specifications will require other size and/or power densities.

System level specifications for the converter include an input voltage of 32-56 V, a switching frequency of 10 kHz-2 MHz, and an output voltage of 13.6+/−0.3 V. Typically 12 V network loads are capable of operating in wide voltage range of 10-15 V. Choosing a nominal converter output voltage of 13.6 V reduces conduction losses on the output side, yet keeps the voltage low enough so that it is not too far from the existing nominal voltage (13.3V) used to charge the battery. The output voltage ripple peak-to-peak is less than or equal to 150 mV, and the maximum operating temperature is 100 C inside the DC-DC converter. The output current ripple is less than or equal to 20% of the maximum DC output current and the maximum output power Pout max is, in various embodiments, 500 W, 1 KW, or 3 KW. The minimum output power Pout min is 10% of Pout max.

Given the desired outputs and specifications the load maximum current is 37.59 A, 75.19 A, and 225.56 A for the three power outputs, 500 W, 1 KW and 3 KW, respectively. The preferred embodiment provides for an isolated converter.

Using wide bandgap devices such as SiC & GaN results in lower on-state resistance and faster switching times, with intrinsic junction temperature limits as high as 600 C, higher switching frequencies and hence higher converter power densities than Si-based devices. Also, because devices can operate at higher junction temperatures without worsening the conduction losses and reliability they will lead to reduced cooling requirements and reduced heat sink size. Thus, the preferred embodiment provides for using wide band gap devices.

The preferred embodiment provides for a maximum duty cycle D of 0.45 for improved transformer efficiency, where D is defined as D=t on/Ts, where Ts=switching period of a switch in single leg of the full bridge converter. Thus, the minimum switch duty cycle, which occurs at maximum DC input voltage, is calculated as Dmin=Dmax*(Vin min/Vin max) where Vin min, and Vin max is the DC input voltage range at the converter input.

Figure 10:
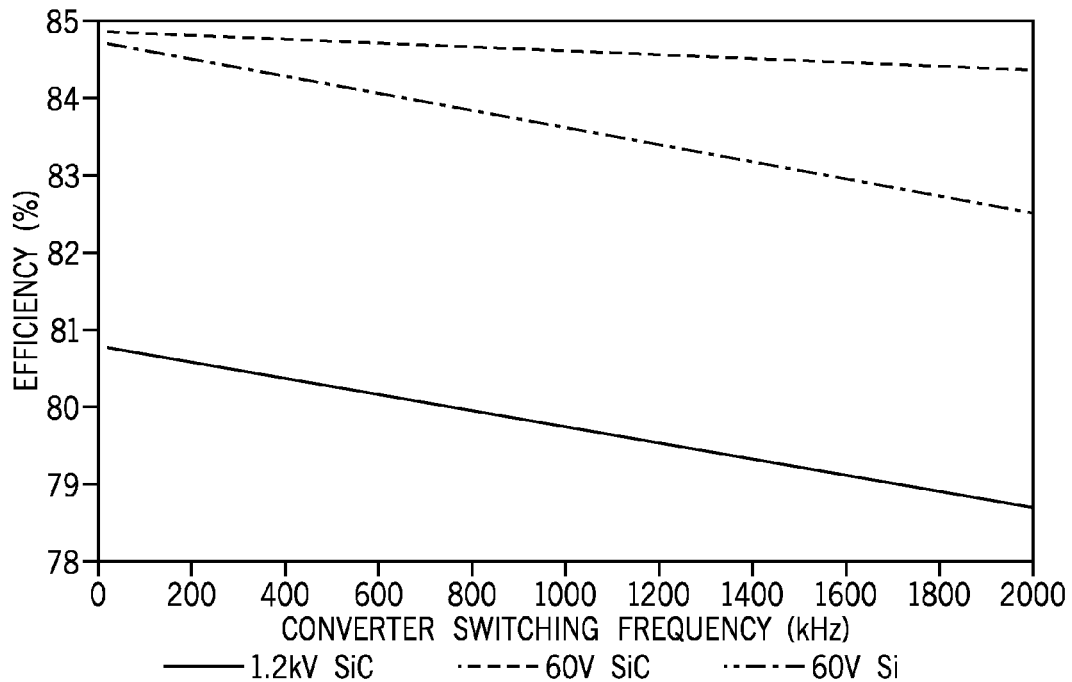
FIG. 10 shows efficiency graphs for converters comprised of various devices.

FIG. 10 shows the efficiency (vertical axis) for a full bridge topology for various devices and converter switching frequencies (which is twice the device switching frequency) for 500 W converter using three types of MOSFETs: 60V Si, 1200V SiC, and 60V SiC; over the frequency range of 20 kHz-2 MHz.

Figure 11:
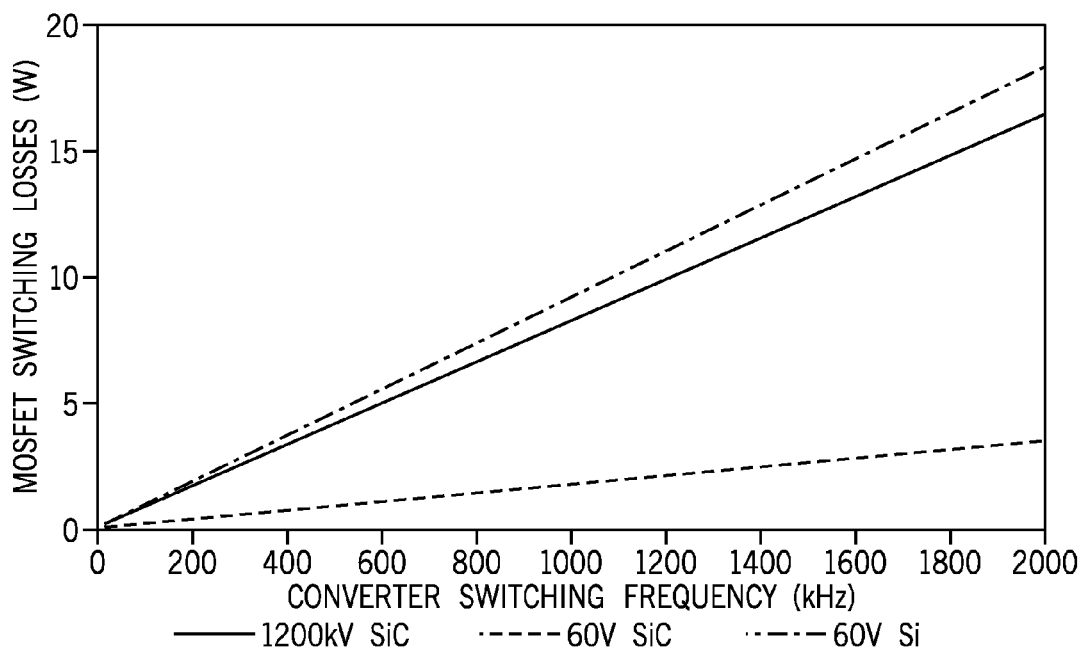
FIG. 11 shows switching losses corresponding to the graphs of FIG. 10.

FIG. 11 shows switching losses corresponding to the efficiencies of FIG. 10.

Numerous modifications may be made to the present disclosure which still fall within the intended scope hereof. Thus, it should be apparent that there has been provided a method and apparatus for a dc-dc converter for use in a mHEV that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The invention claimed is:

1. A converter used in a vehicle having a first electrical system at a first voltage and a second electrical system at a second voltage comprising:
an input filter adapted to receive power from the first electrical system;
a dc-dc converter, connected to receive power from the input filter, and having at least one control input wherein the power output of the converter is at least 500 watts;
an output filter connected to receive power from the dc-dc converter and adapted to provide power to the second electrical system; and
a controller, having a control output connected to the control input;
wherein the dc-dc converter includes wide band gap semiconductor devices.

2. The converter of claim 1 wherein the dc-dc converter is a buck converter.

3. The converter of claim 1 wherein the first voltage is less than 60 volts and greater than 12 volts.

4. The converter of claim 3 wherein the first voltage is approximately 48 volts.

5. The converter of claim 1 wherein the second voltage is approximately 12 volts.

6. The converter of claim 1, wherein the wide band gap semiconductor devices are at least one of SiC and GaN transistors.

7. The converter of claim 1, wherein the efficiency of the dc-dc converter is at least 80%.

8. The converter of claim 1, wherein the efficiency of the dc-dc converter is at least 90%.

9. The converter of claim 1, wherein the size of the converter is at most 120 cc.

10. The converter of claim 9, wherein the power output of the converter is at least 1000 watts.

11. The converter of claim 10, wherein the power output of the converter is up to 3000 watts.

12. The converter of claim 1, wherein the power density of the converter is least 4.17 watts/cc.

13. The converter of claim 12, wherein the power density of the converter is least 8.33 watts/cc.

14. The converter of claim 13, wherein the power density of the converter is least 25 watts/cc.

15. The converter of claim 1, wherein the dc-dc converter is a half-bridge converter.

16. The converter of claim 1, wherein the dc-dc converter includes at least one of a full-bridge converter and a push-pull converter.

17. The converter of claim 1, wherein the control output is provided at a frequency of at least 20 KHz.

18. The converter of claim 17, wherein the control output is provided at a frequency of at least 1 MHz.

19. The converter of claim 17, wherein the control output is provided at a frequency of at least 2 MHz.

20. The converter of claim 1 wherein the vehicle is a start stop vehicle.

21. The converter of claim 20 wherein the vehicle is a micro hybrid vehicle.

22. A converter used in a vehicle having a first electrical system at a first voltage and a second electrical system at a second voltage comprising:
an input filter adapted to receive power from the first electrical system;
a dc-dc converter, connected to receive power from the input filter, and having at least one control input;
an output filter connected to receive power from the dc-dc converter and adapted to provide power to the second electrical system; and
a controller, having a control output connected to the control input;
wherein the power density of the converter is least 4.17 watts/cc and the power output of the converter is at least 500 watts.

23. The converter of claim 22, wherein the power density of the converter is least 8.33 watts/cc.

24. The converter of claim 23, wherein the power density of the converter up to 25 watts/cc.

25. The converter of claim 24, wherein the dc-dc converter includes wide band gap semiconductor devices.

26. The converter of claim 25, wherein the efficiency of the dc-dc converter is at least 80%.

27. The converter of claim 26, wherein the efficiency of the dc-dc converter is at least 90%.

28. The converter of claim 26, wherein the dc-dc converter is at least one of a half-bridge converter, a fill-bridge converter, and a push-pull converter.

29. The converter of claim 28, wherein the control output is provided at a frequency of at least 20 KHz.

30. The converter of claim 29, wherein the control output is provided at a frequency of at least 1 MHz.

31. The converter of claim 30, wherein the control output is provided at a frequency of at least 2 MHz.

32. A dc-dc converter used in a micro hybrid vehicle having a first electrical system and a second electrical system, wherein the size of the converter is at most 120 cc, and the power output of the converter is at least 500 watts.

33. The dc-dc converter of claim 32, wherein the power output of the dc-dc converter is at least 1000 watts.

34. The converter of claim 33, wherein the power output of the dc-dc converter is up to 3000 watts.

35. The dc-dc converter of claim 33, further at least one SiC and GaN of semiconductor devices connected to convert power.

36. The dc-dc converter of claim 33, wherein the efficiency of the dc-dc converter is at least 80%.

37. The dc-dc converter of claim 33, wherein the efficiency of the dc-dc converter is at least 90%.

38. The converter of claim 36, wherein the dc-dc converter is at least one of a half-bridge converter, a full-bridge converter, and a push-pull converter.

39. The converter of claim 36, wherein the control output is provided at a frequency of at least 20 KHz.

40. The converter of claim 39, wherein the control output is provided at a frequency of at least 1 MHz.

41. The converter of claim 40, wherein the control output is provided at a frequency of at least 2 MHz.

* * * * *